United States Patent Office 3,556,676
Patented Jan. 19, 1971

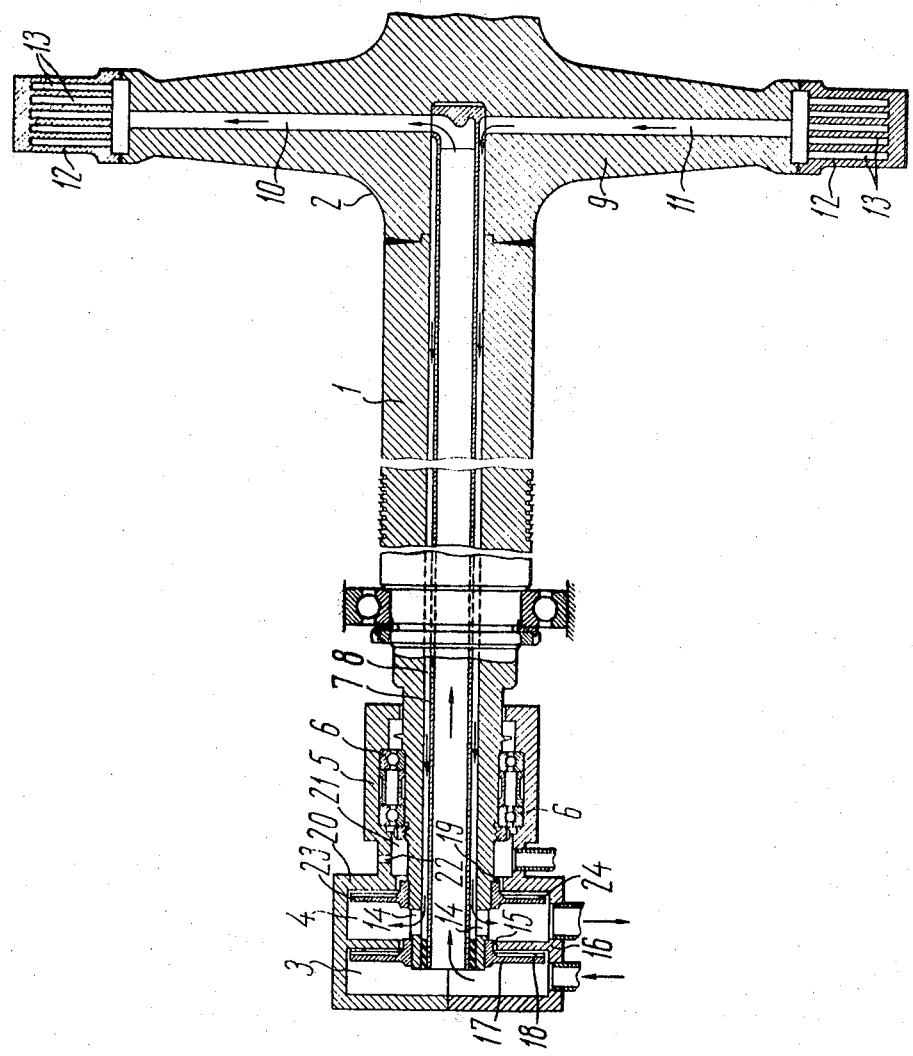

3,556,676
LIQUID-COOLING SYSTEM OF GAS TURBINE ROTORS
Igor Konstantinovich Gorbunov, Leninoclachnoe, Kvartal 4, korpus 18, kv. 95; Aram Vartanovich Avakov, Leningradsky prospekt 5, kv. 150; and Dmitry Ivanovich Mariev, Leninsky prospekt 99, korpus 123, kv. 66, all of Moscow, U.S.S.R.
Filed Aug. 28, 1968, Ser. No. 756,048
Int. Cl. F01d 5/08
U.S. Cl. 416—96                                          1 Claim

ABSTRACT OF THE DISCLOSURE

A sealing device in a cooling system for a turbine rotor includes a chamber into which the rotor extends. The rotor supports an impeller in the chamber proximate an opening in the wall through which the rotor extends. The impeller, upon rotating, acts as a sealing device for preventing a fluid from escaping from the chamber through the aforesaid opening.

---

This invention relates to gas turbine plants and more particularly to liquid-cooling systems for gas turbine rotors.

Known in the art are systems for liquid cooling of a gas turbine rotor comprising a chamber for admitting the cooling liquid into the rotating turbine rotor, and a further chamber for draining the cooling liquid from the rotor, the two chambers being located at the end of the rotor shaft. The end of the rotor shaft is located inside said chambers. The gaps between the chamber walls and the rotor shaft are sealed by means of cups.

However, operation of the gas turbine with the liquid-cooling system of the type described above involves certain difficulties due to the constant contact of the rotary member with the elements of the immovable packing. The friction occurring at the contact points results in intensive wear of the packing elements. The particles of the packing material (emerging as a result of attrition of the latter) pollute the cooling liquid and become lodged in the passages of comparatively small cross-section, which are provided in the rotor blades. Moreover, in case of an appreciable vibration of the rotor, the packing elements are subject to destruction.

It is an essential object of this invention to obviate this disadvantage by providing a liquid-cooling system for a gas turbine rotor which, although comparatively simple in design, would ensure dependable operation of the turbine.

According to this invention, the above-said object has been achieved by the provision in a passageway that communicates the cooling-liquid inlet and outlet chambers with each other and with the impellers atmosphere, of said impellers being fastened on the rotor shaft so that, with said impellers rotating and because of centrifugal force, a pressure head develops, preventing the flow of the cooling liquid from one chamber into the other, and from the chambers to the atmosphere.

In the preferable embodiment of the liquid-cooling system, according to this invention, the impellers should preferably be installed in the cooling-liquid inlet and outlet chambers proximate the holes provided in the end faces of said chambers for the passage of the rotor shaft.

The blades of said impellers should preferably be fastened to the discs from the side of a lower pressure.

The pilot liquid-cooling system built according to this invention is rated for a 5 atm. pressure.

The appended drawing shows the principal diagram of a part of the liquid-cooling system for a gas turbine rotor, according to the invention, which is given by way of example illustrating an exemplary embodiment of the invention.

The liquid-cooling sytsem for a rotor 1 of a gas turbine 2 comprises a chamber 3 for feeding the cooling liquid to the rotor and a chamber 4 for draining said liquid from the rotor. These chambers are arranged inside a housing 5 which is a common casing both for the chambers and for bearings 6 in which the end of the rotor shaft runs. The end of the shaft of the rotor 1 passes through the chamber 4, being partly accommodated in the chamber 3.

The drilled center bore of the rotor accommodates a pipe 7 whose outside diameter is smaller than the diameter of the center bore, so that a circular or annular clearance forming a passage 8 is provided btween said pipe and the walls of said bore. In a disc 9 of the turbine, there are passages 10, 11 arranged radially in relation to the axis of the rotor rotation (the drawing shows one of each said passages). A certain portion of these passages, namely, passages 10, communicate with the pipe 7, while the other portion, namely, passages 11, communicate with the circular clearance forming the passage 8. The blades 12 have drilled bores 13 communicating with the passages 10 and 11, respectively.

The cooling liquid flows from the chamber 3 to the pipe 7 to enter the blades 12 through the passages 10 and 13. After blade cooling, the liquid flows through the passages 11 to the circular clearance 8 in the rotor and leaves the rotor through ports 14, flowing first into the chamber 4 and then being drained from the turbine.

Extending through the passageway connecting the chambers 3 and 4, proximate a hole 15 provided in a common end-face wall 16 of the chambers for the passage of the rotor shaft, is supported on impeller 17 fastened on the rotor shaft. Blades 18 of impeller 17 are fastened to the disc from the side of a lower pressure, i.e. the chamber 4 for discharging the cooling liquid.

In the passageway connecting the chamber 4 with the atmosphere, which passageway includes a hole 19 provided in an end-face wall 20 of the chamber 4, circular chamber 21 and hole 22, there is supported an impeller 23 fastened to the rotor shaft 1 at the hole 19. Blades 24 of impeller 23 are fastened to the impeller disc from the side of a lower pressure, i.e., the circular chamber 21.

With said impellers rotating and because of centrifugal force, a pressure head develops preventing the liquid from flowing from the chamber 3 into the chamber 4, and from chamber 4 to the atmosphere.

We claim:
1. A cooling system for a gas turbine comprising a hollow rotor including opposite end portions and an inner wall defining a longitudinal channel extending between said opposite end portions, said gas turbine being supported on one of said opposite end portions, a hollow tube provided with a channel supported in said channel of said rotor and spaced from said inner wall to define a longitudinal annular clearance between said inner wall and said hollow tube, said gas turbine including an inlet channel and a return channel, said inlet channel communicating with the channel of said hollow tube and said return channel communicating with said longitudinal annular clearance, a housing into which the other of said opposite end portions of said rotor extends, said housing defining an inlet chamber and an outlet chamber, said inlet chamber communicating with said channel of said hollow tube, and said outlet chamber communicating with said longitudinal annular clearance, a partition separating said inlet chamber from said outlet chamber, a chamber wall separating said outlet chamber from the atmosphere, said partition and said chamber wall each being provided with an opening having a periphery through which the other of said opposite end portions of said rotor longitudinally extends, said rotor being disposed in the opening of said partition and said chamber wall and spaced from the periphery of the openings so as to define a pair of spaced annular clearances, and a pair of spaced impellers supported on said rotor, one in said inlet chamber spaced proximate said partition and the other in said outlet chamber spaced proximate said chamber wall, said pair of impellers each including a respective disc supporting a respective blade, the impeller supported in the inlet chamber supporting its respective blade between its respective disc and said partition, the impeller supported in said outlet chamber supporting its respective blade between its respective disc and said chamber wall, the impeller supported in said inlet chamber upon rotating, acting to prevent a cooling medium supplied to said inlet chamber from flowing into the outlet chamber through the annular clearance between said partition and said rotor, and the impeller supported in said outlet chamber upon rotating, acting to prevent a cooling medium supplied to said outlet chamber from flowing into the atmosphere through the annular clearance between said chamber wall and said rotor.

References Cited

UNITED STATES PATENTS

| | | | |
|---|---|---|---|
| 1,932,214 | 10/1933 | Hornschuch | 103—111C3(UX) |
| 2,650,060 | 8/1953 | Stalker | 253—39.15(S) |
| 2,667,326 | 1/1954 | Ledinegg | 253—39.15(S) |
| 2,750,736 | 6/1956 | Holzwarth et. al. | 253—39.15(S)(X) |
| 2,778,601 | 1/1957 | Eckert | 253—39.15(S) |
| 3,238,000 | 3/1966 | Muijderman et. al. | 308—240(X) |

EVERETTE A. POWELL, JR., Primary Examiner

U.S. Cl. X.R.

416—174